United States Patent
Sano et al.

(10) Patent No.: US 11,869,706 B2
(45) Date of Patent: Jan. 9, 2024

(54) INDUCTOR COMPONENT

(71) Applicant: Murata Manufacturing Co., Ltd., Kyoto-fu (JP)

(72) Inventors: Rikiya Sano, Nagaokakyo (JP); Kenta Kondo, Nagaokakyo (JP); Yoshiyuki Oota, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 408 days.

(21) Appl. No.: 16/928,934

(22) Filed: Jul. 14, 2020

(65) Prior Publication Data

US 2021/0027937 A1 Jan. 28, 2021

(30) Foreign Application Priority Data

Jul. 25, 2019 (JP) ................. 2019-136881

(51) Int. Cl.
*H01F 27/32* (2006.01)
*C03B 19/06* (2006.01)
*H01F 17/00* (2006.01)
*C03C 10/00* (2006.01)

(52) U.S. Cl.
CPC .......... *H01F 27/323* (2013.01); *C03B 19/06* (2013.01); *C03C 10/0054* (2013.01); *H01F 17/0013* (2013.01); *C03C 2214/20* (2013.01); *H01F 2017/004* (2013.01)

(58) Field of Classification Search
CPC ............. H01F 17/0013; H01F 27/2804; H01F 2027/2809; H01F 17/0006; H01F 5/003; H01F 27/323; H01F 2017/004; C03C 10/0054; C03C 2214/20

USPC ................................... 336/200, 232
See application file for complete search history.

(56) References Cited

U.S. PATENT DOCUMENTS

| | | | |
|---|---|---|---|
| 2014/0145816 A1* | 5/2014 | Sato ............... | H01F 5/06 336/208 |
| 2015/0294780 A1 | 10/2015 | Maeda | |
| 2017/0352467 A1* | 12/2017 | Kakiuchi ............... | H01F 27/29 |
| 2019/0164676 A1 | 5/2019 | Tsuduki et al. | |

(Continued)

FOREIGN PATENT DOCUMENTS

| | | |
|---|---|---|
| CN | 109935437 A | 6/2019 |
| JP | 2005-203641 A | 7/2005 |
| JP | 2018-131353 A | 8/2018 |

(Continued)

OTHER PUBLICATIONS

An Office Action; "Notice of Reasons for Refusal," mailed by the Japanese Patent Office dated Apr. 5, 2022, which corresponds to Japanese Patent Application No. 2019-136881 and is related to U.S. Appl. No. 16/928,934 with English language translation.

*Primary Examiner* — Tszfung J Chan
(74) *Attorney, Agent, or Firm* — Studebaker & Brackett PC

(57) ABSTRACT

An inductor component includes an element assembly formed of an insulator material and an inner electrode arranged in the element assembly. The insulator material contains a base material formed of an amorphous material containing B, Si, O, and K and a crystalline filler and includes a filler-poor glass portion in a region along the inner electrode. The content of the crystalline filler in the filler-poor glass portion is lower than the content of the crystalline filler in the element assembly excluding the filler-poor glass portion.

20 Claims, 11 Drawing Sheets

(56) References Cited

U.S. PATENT DOCUMENTS

2019/0189333 A1    6/2019   Kido et al.

FOREIGN PATENT DOCUMENTS

| | | | | |
|---|---|---|---|---|
| JP | 2019-102507 A | | 6/2019 | |
| JP | 2019-110170 A | | 7/2019 | |
| KR | 2015105786 A | * | 9/2015 | |
| WO | WO-2017122381 A1 | * | 7/2017 | ........... B32B 17/061 |

* cited by examiner

INDUCTOR COMPONENT

CROSS-REFERENCE TO RELATED APPLICATION

This application claims benefit of priority to Japanese Patent Application No. 2019-136881, filed Jul. 25, 2019, the entire content of which is incorporated herein by reference.

BACKGROUND

Technical Field

The present disclosure relates to an inductor component.

Background Art

In recent years, in accordance with higher frequencies of communication equipment, for example, cellular phones, many surface-mounting type small multilayer coils (hereafter referred to as inductor components) compatible with high frequencies in a GHz band have been adopted in sending portions and receiving portions of the communication equipment. In particular, regarding the inductor components, to address high frequencies, it is desirable that insulating portions exhibit low permittivity and low dielectric loss and it is desirable that conductor portions exhibit low resistance and low loss. To satisfy such demands, the materials and the shapes of the inductor components are selected. Examples of widely used materials for forming the inductor components include glass-based insulating materials which are amorphous materials exhibiting low permittivity and low dielectric loss and good conductor materials exhibiting low resistance and low loss (for example, Ag and Cu).

For example, Japanese Unexamined Patent Application Publication No. 2018-131353 describes an inductor component including an element assembly that contains a glass-based insulating material and an inner electrode disposed in the element assembly.

When the inductor component contains the glass-based insulating material, the strength of the inductor component may be reduced, and cracking may occur in the element assembly of the inductor component due to impact during mounting and stress during substrate bending. Regarding such a problem, a measure such as the addition of a crystalline filler to the glass-based insulating material is taken. In Japanese Unexamined Patent Application Publication No. 2018-131353, the element assembly portion is a glass ceramic containing the glass-based insulating material and the crystalline filler. The crystalline filler contains a specific amount of alumina particles and a specific amount of zirconia particles.

Addition of the crystalline filler enhances the strength of the glass-based insulating material on the one hand but causes a new problem that the Q-value is not sufficiently increased on the other hand. For example, since the permittivity of the crystalline filler is relatively high, addition of the crystalline filler increases dielectric loss. Meanwhile, during a sintering step in the production of an inductor component, since the melting temperature of the crystalline filler is high, addition of the crystalline filler increases the rheology of a liquefied glass phase in a high-temperature range. As a result, smoothing of the conductor surface is impaired so as to increase loss.

SUMMARY

Accordingly, the present disclosure provides an inductor component wherein the Q-value can be increased at high frequencies and the strength is enhanced.

The present inventors performed intensive research and noted to localize an amorphous material and a crystalline filler in each portion of an inductor component in accordance with desirable physical properties. The strength can be enhanced by the element assembly of the inductor component containing the crystalline filler. Further, dielectric loss around an inner electrode of the inductor component can be reduced by localizing the amorphous material around the inner electrode and by reducing the amount of the crystalline filler around the inner electrode. As a result, it was realized to increase the Q-value and to enhance the strength. That is, the present disclosure includes the following embodiments.

According to an aspect of the present disclosure, an inductor component includes an element assembly formed of an insulator material and an inner electrode arranged in the element assembly. The insulator material contains a base material formed of an amorphous material containing B, Si, O, and K and a crystalline filler and includes a filler-poor glass portion in a region along the inner electrode, and the content of the crystalline filler in the filler-poor glass portion is lower than the content of the crystalline filler in the element assembly excluding the filler-poor glass portion.

In the present specification, the filler-poor glass portion is a portion having a relatively low content of the crystalline filler. In particular, the filler-poor glass portion denotes a portion in which the content of the crystalline filler is about 50% or less the content of the crystalline filler in the center portion of the element assembly. The content of the crystalline filler is the area of the crystalline filler per unit area in the cross section of the element assembly. The center portion of the element assembly denotes a portion within a radius of about 10 μm from the center point of the element assembly in the cross section of the element assembly. In the case in which the element assembly is, for example, a substantially rectangular parallelepiped, the center point is a point at which all the length, the width, and the height of the element assembly are divided into halves. If the portion within the radius of about 10 μm is occupied by the inner electrode and the content of the crystalline filler is not calculated, the center portion is expanded to a portion within a radius of about 20 μm from the center point. In this regard, in the case in which the element assembly is a multilayer body, the cross section of the element assembly subjected to calculation of the content of the crystalline filler is preferably a cross section orthogonal to the stacking direction of the multilayer body.

According to the above-described aspect, the element assembly contains the crystalline filler. Consequently, regarding the element assembly, cracking due to impact during mounting and stress during substrate bending can be suppressed from occurring. As a result, the strength of the inductor component according to the above-described aspect can be enhanced.

According to the above-described aspect, the filler-poor glass portion is located along the inner electrode. That is, around the inner electrode, the content of the crystalline filler having relatively high permittivity is reduced. Consequently, regarding the inductor component according to the above-described aspect, the dielectric loss can be reduced, and the Q-value can be increased at high frequencies.

Further, it is conjectured that, since the filler-poor glass portion is located along the inner electrode, during a sintering step in the method for manufacturing the inductor component, a liquefied glass phase having reduced rheology exists around the inner electrode. That is, it is conjectured that liquid-phase sintering occurs around the inner electrode during the sintering step. As a result, regarding the inductor component according to the above-described aspect, the smoothness of the surface of the inner electrode is improved, and the Q-value can be increased at high frequencies.

According to an embodiment of the inductor component, the inner electrode partly includes the amorphous material containing B, Si, O, and K.

In the present specification, "the inner electrode partly includes the amorphous material" denotes the state in which the amorphous material is not completely embedded in the inner electrode and part of the amorphous material is exposed at the outer circumferential surface of the inner electrode.

According to the above-described embodiment, the inner electrode partly includes the amorphous material. Consequently, the liquid phase sintering is conjectured to advance to such an extent that the amorphous material reaches the surface from inside the inner electrode during the sintering step in the method for manufacturing the inductor component. As a result, regarding the inductor component according to the present embodiment, the smoothness of the inner electrode is further improved, and the Q-value can be further increased at high frequencies.

In addition, a high-frequency current preferentially flows through the surface portion of the inner electrode due to a skin effect. Therefore, the inner electrode partly including the amorphous material increases the surface area of the inner electrode and reduces electric resistance. As a result, regarding the inductor component according to the present embodiment, the Q-value can be further increased at high frequencies.

According to an embodiment of the inductor component, the inner electrode completely includes the amorphous material containing B, Si, O, and K.

In the present specification, "the inner electrode completely includes the amorphous material" denotes the state in which the amorphous material is completely embedded in the inner electrode and the amorphous material is not exposed at the outer circumferential surface of the inner electrode.

According to the above-described embodiment, the inner electrode completely including the amorphous material forms the interface between the inner electrode and the amorphous material inside the inner electrode. Consequently, the surface area of the inner electrode increases, and electric resistance is reduced due to a skin effect at high frequencies. As a result, regarding the inductor component according to the present embodiment, the Q-value can be further increased at high frequencies.

According to an embodiment of the inductor component, the crystalline filler contains any of Al, Si, Ti, Zr, Ca, Mg, Fe, and Mn.

According to the above-described embodiment, the crystalline filler containing any of Al, Si, Ti, Zr, Ca, Mg, Fe, and Mn enables the strength of the inductor component according to the present embodiment to be further enhanced.

According to an embodiment of the inductor component, the content of the crystalline filler in the filler-poor glass portion is about 10% or less the content of the crystalline filler in the center portion of the element assembly.

According to the above-described embodiment, since the crystalline filler having relatively high permittivity is further reduced in amount around the inner electrode, the dielectric loss of the inductor component is further reduced, and the Q-value can be further increased.

According to an embodiment of the inductor component, the filler-poor glass portion covers the inner electrode.

According to the above-described embodiment, since the filler-poor glass portion covering the inner electrode further reduces the crystalline filler having relatively high permittivity in amount around the inner electrode, the dielectric loss of the inductor component is further reduced, and the Q-value can be further increased. In this regard, covering the inner electrode denotes the inner electrode being completely coated. Meanwhile, coating the inner electrode denotes arranging along the circumference of the inner electrode.

According to an embodiment of the inductor component, the inner electrode is a coil having a winding portion that is spirally wound. Also, the filler-poor glass portion has a first filler-poor glass portion in contact with the outer edge of the winding portion of the coil and a second filler-poor glass portion in contact with the inner edge of the winding portion in a plane perpendicular to the winding axis of the coil, and the thickness of the first filler-poor glass portion is less than the thickness of the second filler-poor glass portion.

According to the above-described embodiment, a relatively large amount of crystalline filler is contained in a region near to the outer surface of the inductor component and the strength is relatively high. Therefore, regarding the inductor component according to the present embodiment, cracking due to external impact is suppressed from occurring and the strength can be further enhanced.

In such a case, a large amount of filler-poor glass portion exists near the inner edge of the coil, and the amount of the crystalline filler is relatively small. A high-frequency current preferentially flows through the inner-edge portion of the coil due to the skin effect. That is, a current preferentially flows through the portion in which the content of the crystalline filler is relatively low. Therefore, regarding the inductor component according to the present embodiment, dielectric loss is reduced, and the Q-value can be further increased.

According to an embodiment of the inductor component, an outer electrode electrically coupled to the inner electrode is further included. The inner electrode is a coil having a winding portion that is spirally wound and an extended electrode to electrically couple the winding portion to the outer electrode, the filler-poor glass portion has a first portion in contact with at least part of the winding portion and a second portion in contact with at least part of the extended electrode, and the thickness of the second portion is less than the thickness of the first portion.

According to the above-described embodiment, a relatively large amount of crystalline filler is contained in a region near to the outer surface of the inductor component and the strength is relatively high. Therefore, regarding the inductor component according to the present embodiment, cracking due to external impact can be suppressed from occurring.

According to an embodiment of the inductor component, an outer electrode electrically coupled to the inner electrode is further included. The inner electrode is a coil having a winding portion that is spirally wound and an extended electrode to electrically couple the winding portion to the outer electrode, the filler-poor glass portion has a first portion in contact with at least part of the winding portion and a third portion in contact with at least part of the outer electrode, and the thickness of the third portion is less than the thickness of the first portion.

According to the above-described embodiment, a relatively large amount of crystalline filler is contained in a region near to the outer surface of the inductor component and the strength is relatively high. Therefore, regarding the inductor component according to the present embodiment, cracking due to external impact can be suppressed from occurring.

According to an embodiment of the inductor component, the element assembly is a multilayer body in which a plurality of insulating layers provided with a coil conductor layer are stacked, and of the plurality of insulating layers, the thickness of the filler-poor glass portion in each of the lowermost insulating layer and the uppermost insulating layer in the coil axis direction is less than the thickness of the filler-poor glass portion in each of the insulating layers other than the lowermost insulating layer and the uppermost insulating layer.

According to the above-described embodiment, a relatively large amount of crystalline filler is contained in a region near to the outer surface of the inductor component and the strength is relatively high. Therefore, regarding the inductor component according to the present embodiment, cracking due to external impact can be suppressed from occurring.

According to an embodiment of the inductor component, the inner electrode has a smooth surface.

The inner electrode having a smooth surface enables the loss of a current that flows through the inner electrode to be reduced. In particular, since a high-frequency current preferentially flows through the surface portion of the inner electrode due to a skin effect, current loss can be further reduced. Regarding the inductor component according to the present embodiment, the Q-value can be further increased.

In the present specification, a smooth surface denotes the state in which the amounts of gaps and amorphous materials that are completely included in the inner electrode is larger than the amounts of gaps and amorphous materials that are partly included.

Other features, elements, characteristics, and advantages of the present disclosure will become more apparent from the following detailed description of preferred embodiments of the present disclosure with reference to the attached drawings.

DETAILED DESCRIPTION

Figure 1:
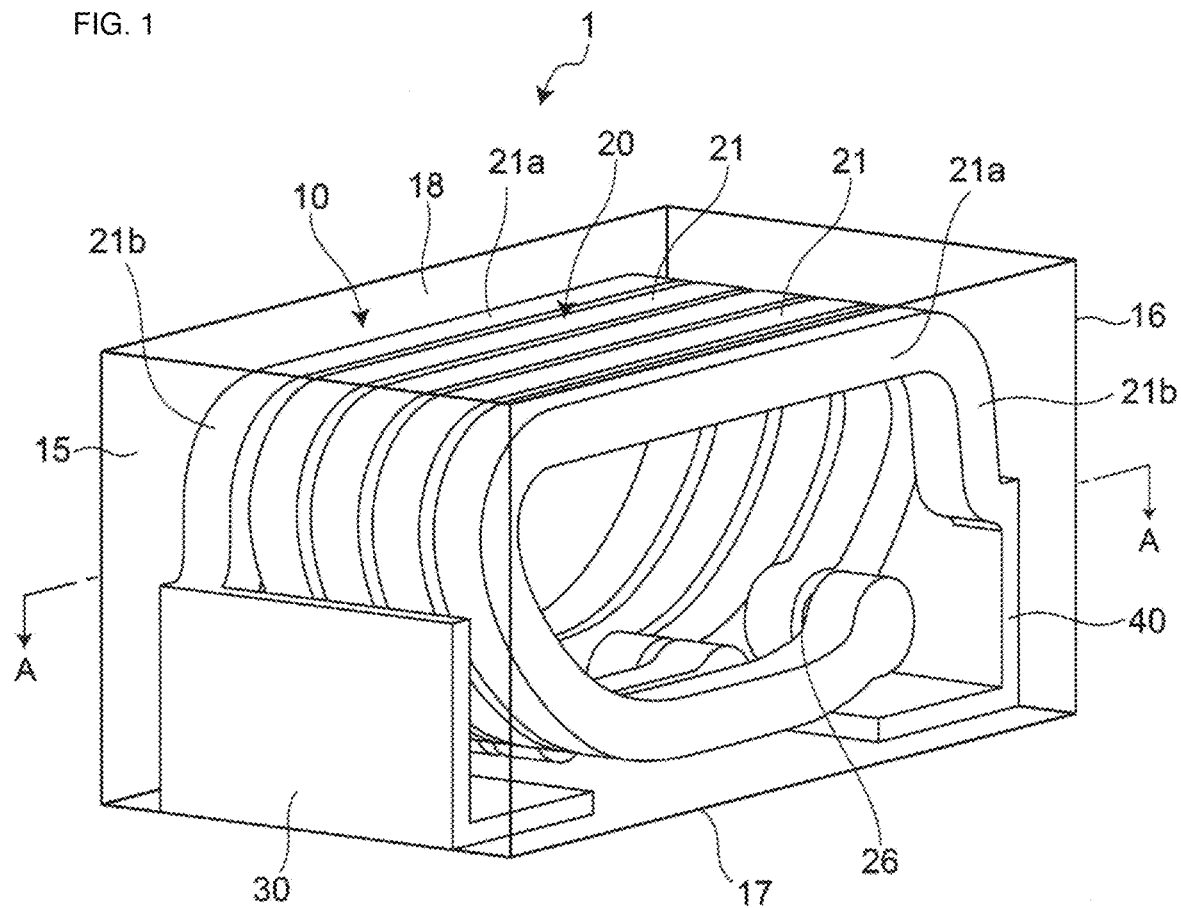
FIG. 1 is a perspective view showing a first embodiment of an inductor component.

An inductor component according to an aspect of the present disclosure will be described below in detail with reference to the embodiments shown in the drawings. In this regard, some drawings are schematic, and actual dimensions and ratios are not limited to being reflected.

First Embodiment

Configuration

Figure 2:
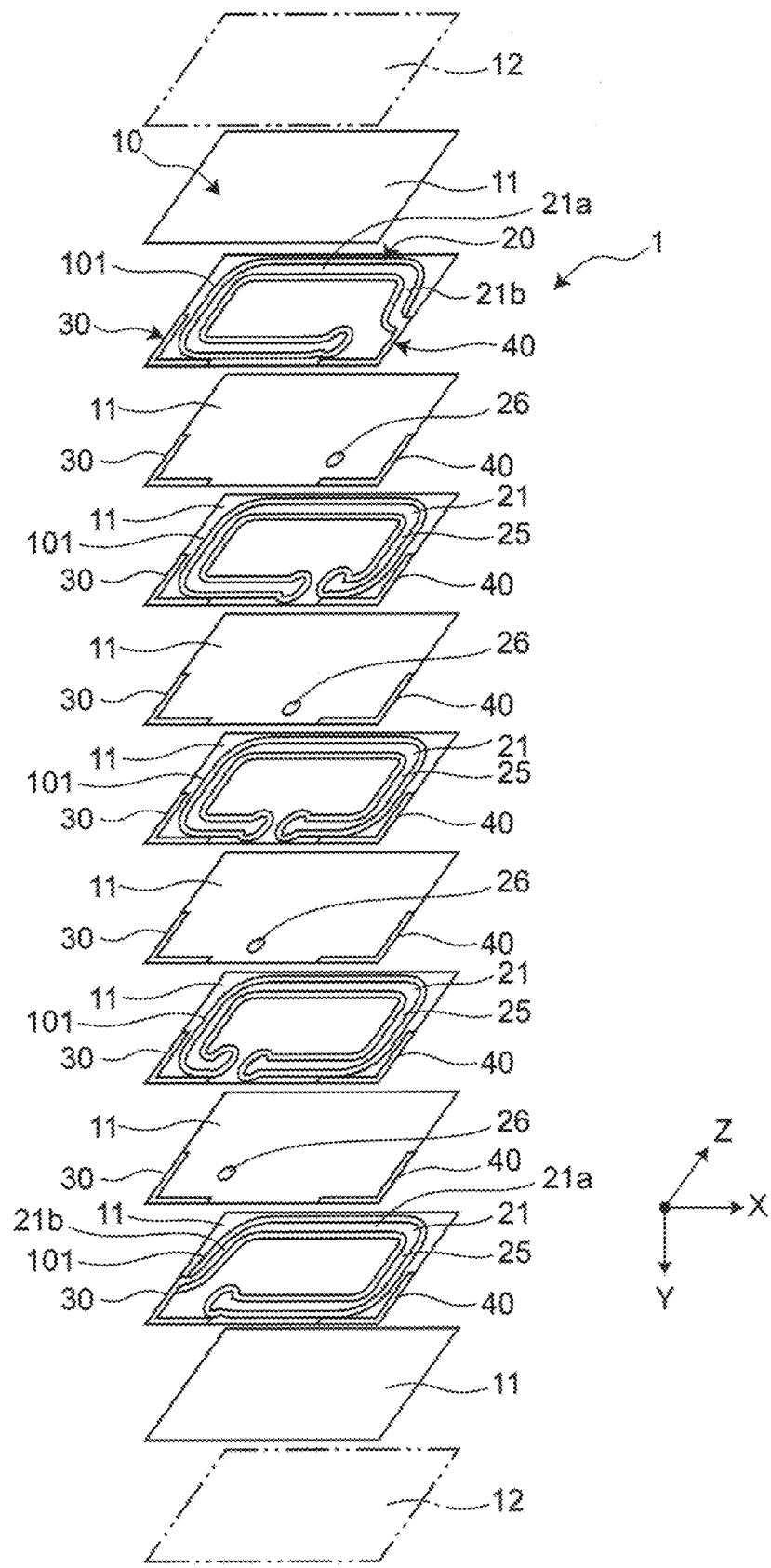
FIG. 2 is an exploded perspective view showing the first embodiment of the inductor component.
Figure 3:
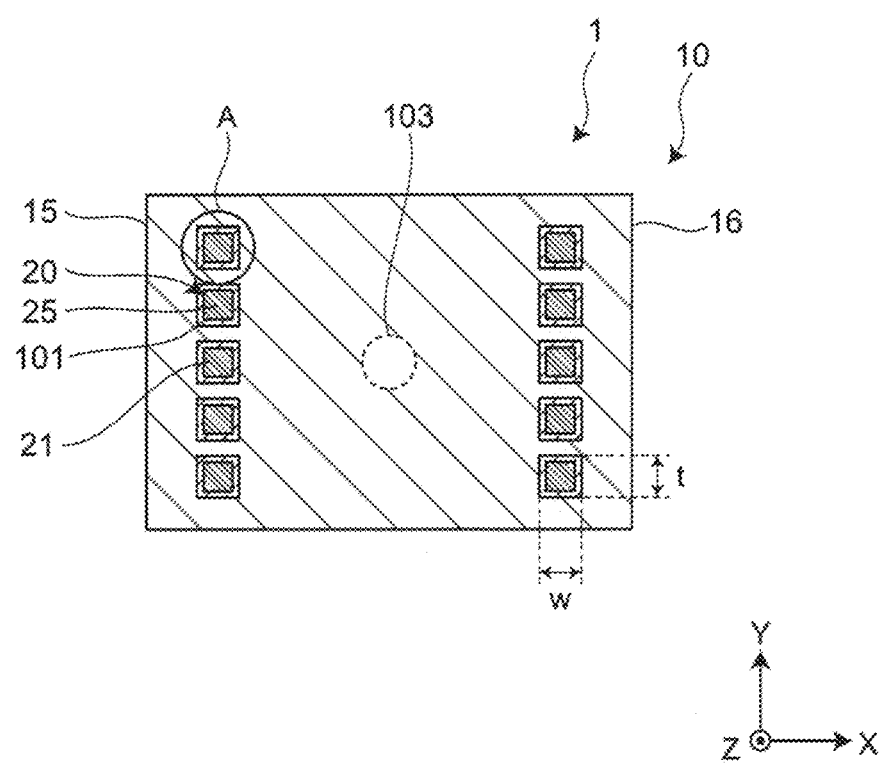
FIG. 3 is a sectional view cut along line A-A in FIG. 1.
Figure 4:
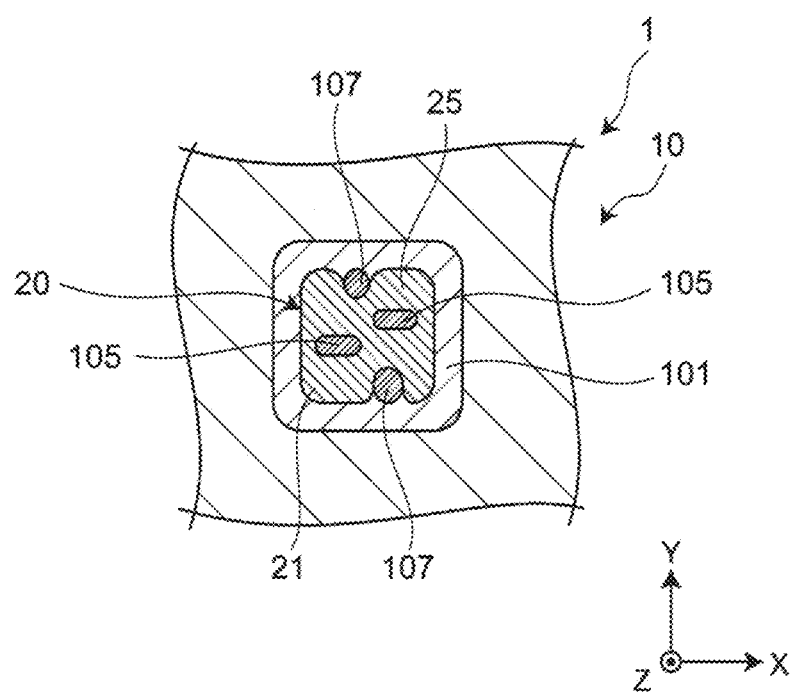
FIG. 4 is a diagram showing a magnified portion A in FIG. 3.

FIG. 1 is a perspective view showing a first embodiment of an inductor component. FIG. 2 is an exploded perspective view showing the first embodiment of the inductor component. FIG. 3 is a sectional view cut along line A-A in FIG. 1. FIG. 4 is a magnified partial view of the diagram (diagram showing a magnified portion A) in FIG. 3.

As shown in FIG. 1 and FIG. 2, the inductor component 1 includes an element assembly 10, a coil 20 that is an inner electrode arranged in the element assembly 10, and a first outer electrode 30 and a second outer electrode 40 that are electrically coupled to the coil 20. In FIG. 1, the element assembly 10 is expressed as being transparent so that the internal structure (in particular, the structure of the coil 20) of the element assembly 10 is readily understood. Meanwhile, in FIG. 1, a filler-poor glass portion is omitted so that the internal structure of the element assembly 10 is readily understood.

The inductor component 1 is electrically coupled to a wiring line of a circuit board, although not shown in the drawing, through the first outer electrode 30 and the second outer electrode 40. The inductor component 1 is used as, for example, an impedance matching coil (matching coil) of a high-frequency circuit and is used for electronic equipment, for example, personal computers, DVD players, digital cameras, televisions, cellular phones, car electronics, and industrial medical machines. However, applications of the inductor component 1 are not limited to these, and the inductor component 1 may also be used for, for example, tuning circuits, filter circuits, and rectifier circuits.

The element assembly 10 is formed into a substantially rectangular parallelepiped. The surfaces of the element assembly 10 include a first end surface 15, a second end surface 16 opposite to the first end surface 15, a bottom surface 17 connected between the first end surface 15 and the second end surface 16, and a top surface 18 opposite to the bottom surface 17. In this regard, as shown in the drawing, the X-direction is a direction orthogonal to the first end surface 15 and the second end surface 16, the Y-direction is a direction parallel to the first end surface 15, the second end surface 16, and the bottom surface 17, and the Z-direction is a direction orthogonal to the X-direction and the Y-direction and is a direction orthogonal to the bottom surface 17. There is no particular limitation regarding the shape of the inductor component 1, and the shape may be substantially the shape of a circular column, a polygonal column, a truncated cone, or a truncated pyramid.

The element assembly 10 is a multilayer body in which a plurality of insulating layers 11 are stacked. The stacking direction of the insulating layers 11 is a direction parallel to the first end surface 15, the second end surface 16, and the bottom surface 17 of the element assembly 10 (Y-direction). That is, the insulating layers 11 have a layered shape, each layer extending in the XZ plane. In the present specification, "parallel" is not limited to a strictly parallel relationship and includes a substantially parallel relationship in consideration of a practical range of variations. Regarding the element assembly 10, interfaces between the plurality of insulating layers 11 may be unclear due to sintering or the like.

The element assembly 10 is formed of an insulator material. The insulator material contains a base material formed of an amorphous material containing B, Si, O, and K and a crystalline filler. The element assembly 10 containing the crystalline filler enables cracking due to impact during mounting and stress during substrate bending to be suppressed from occurring in the element assembly 10. In such a case, the strength of the inductor component 1 according to the present embodiment can be enhanced. The amorphous material containing B, Si, O, and K is, for example, a borosilicate glass containing B, Si, O, and K. Examples of the amorphous material include, other than the borosilicate glass, glasses containing, for example, $SiO_2$, $B_2O_3$, $K_2O$, $Li_2O$, $CaO$, $ZnO$, $Bi_2O_3$, and/or $Al_2O_3$, such as $SiO_2$—$B_2O_3$—$K_2O$-based glasses, $SiO_2$—$B_2O_3$—$Li_2O$—Ca-based glasses, $SiO_2$—$B_2O_3$—$Li_2O$—CaO—ZnO-based glasses, and $Bi_2O_3$—$B_2O_3$—$SiO_2$—$Al_2O_3$-based glasses. At least two types of these glasses may be used in combination.

Preferably, the crystalline filler contains any of Al, Si, Ti, Zr, Ca, Mg, Fe, and Mn. The crystalline filler containing any of the above-described elements enables the strength of the inductor component 1 to be further enhanced.

The first outer electrode 30 and the second outer electrode 40 are composed of a conductive material, for example, Ag or Cu. The first outer electrode 30 is substantially in the shape of, for example, a letter L disposed over the first end surface 15 and the bottom surface 17. The second outer electrode 40 is substantially in the shape of, for example, a letter L disposed over the second end surface 16 and the bottom surface 17. Consequently, of the surfaces of the element assembly 10, the bottom surface 17 may be denoted as the surface on which the first outer electrode 30 and the second outer electrode 40 are disposed, the first end surface 15 may be denoted as the surface on which the first outer electrode 30 only is disposed, and the second end surface 16 may be denoted as the surface on which the second outer electrode 40 only is disposed.

The coil 20 is composed of, for example, the same conductive material and amorphous material as the first outer electrode 30 and the second outer electrode 40. The coil 20 is spirally wound in the stacking direction of the insulating layers 11. The first end of the coil 20 is connected to the first outer electrode 30, and the second end of the coil 20 is connected to the second outer electrode 40. In the present embodiment, the coil 20, the first outer electrode 30, and the second outer electrode 40 are integrated without clear boundaries. However, boundaries are not limited to being unclear and may be more prominently defined by the coil 20 and the outer electrodes being formed of different materials or by different methods.

The coil 20 is formed into substantially the shape of an ellipse when viewed in the axis direction, but the shape is not limited to this. Examples of the shape of the coil 20 include substantially a circle, an ellipse, a rectangle, and other polygons, as well as combinations of these. The axis direction of the coil 20 denotes the direction of the center axis of the spiral of the wound coil 20. In the inductor component 1, the axis direction of the coil 20 is the same direction as the stacking direction of the insulating layers 11. However, the axis direction of the coil 20 may be perpendicular to the stacking direction of the insulating layers 11.

The coil 20 has winding portions 21a that are spirally wound and extended electrodes 21b to electrically couple the winding portions 21a to the outer electrodes 30 and 40. The coil 20 includes a coil wiring line 21 wound in a plane. A plurality of coil wiring lines 21 are stacked in the axis direction. Each coil wiring line 21 is formed by being wound on a principal surface (XZ plane) of the insulating layer 11 orthogonal to the axis direction. The coil wiring lines adjacent to each other in the stacking direction are electrically arranged in series through a via wiring line (via hole conductor) 26 that extends through the insulating layer 11 in the thickness direction (Y-direction). In this manner, the plurality of coil wiring lines 21 are electrically coupled to each other in series so as to form a spiral. Specifically, the coil 20 has a configuration in which a plurality of coil wiring lines 21 each having less than 1 turn are electrically connected to each other and stacked, and the coil 20 has a helical shape. Each coil wiring line 21 is a layer of coil conductor layer 25. The coil wiring lines 21 have winding portions 21a wound in a plane and extended electrodes 21b to electrically couple the winding portions 21a to the outer electrodes 30 and 40. The coil wiring line 21 (coil conductor layer 25) is formed on the insulating layer 11.

As shown in FIG. 3 and FIG. 4, the coil 20 has a smooth surface. That is, the surface of the coil 20 is smooth. The smooth surface of the coil 20 reduces the loss of current flowing through the coil 20. In particular, since a high-frequency current preferentially flows through the surface portion of the coil 20 due to a skin effect, loss of current can be further reduced. In such a case, regarding the inductor component 1, the Q-value can be further increased.

The coil 20 has a substantially square cross-sectional shape, although the shape is not limited to this. Examples of the cross-sectional shape of the coil 20 include substantially a circle, an ellipse, a rectangle, and other polygons and combinations of these. The cross-sectional shape being substantially rectangular with a high aspect ratio enables the Q-value to be further increased since the cross-sectional area of the coil 20 increases and resistance to a high-frequency current is reduced. The aspect ratio is denoted by (thickness t of coil conductor layer 25)/(width w of coil conductor layer 25). The width w of the coil conductor layer 25 denotes the width in the direction orthogonal to the axis direction of the coil 20 in the cross-section orthogonal to the extension direction of the coil conductor layer 25. The thickness t of the coil conductor layer 25 denotes the thickness in the axis direction of the coil 20 in the cross-section orthogonal to the extension direction of the coil conductor layer 25.

The coil 20 is coated with an amorphous material (hereafter referred to as a filler-poor glass portion 101). That is, the insulator material of the element assembly 10 contains the filler-poor glass portion 101 in a region along the coil 20. The filler-poor glass portion 101 is arranged in contact with the coil 20. The filler-poor glass portion 101 is a portion in which the content of the crystalline filler is relatively low. In other words, the content of the crystalline filler in the filler-poor glass portion 101 is lower than the content of the crystalline filler in the element assembly excluding the filler-poor glass portion. In particular, the filler-poor glass portion 101 refers to a portion in which the content of the crystalline filler is about 50% or less the content of the crystalline filler in a center portion 103 of the element assembly 10.

The filler-poor glass portion 101 is disposed along the coil 20. That is, the content of the crystalline filler having relatively high permittivity is reduced around the coil 20.

Consequently, regarding the inductor component 1, dielectric loss can be reduced, and the Q-value can be increased at high frequencies.

Meanwhile, the filler-poor glass portion 101 is conjectured to be due to a liquefied glass phase having reduced rheology during a sintering step in the method for manufacturing the inductor component 1 existing around the coil 20. Therefore, regarding the inductor component 1, the smoothness of the surface of the coil 20 is improved, and the Q-value can be increased at high frequencies.

The content of the crystalline filler is equal to the area of the crystalline filler per unit area in the cross section of the element assembly 10. The cross section of the element assembly 10 is the cross section of the center portion 103 of the element assembly 10 or the cross section of the filler-poor glass portion 101. The center portion 103 of the element assembly 10 denotes a portion within a radius of about 10 µm from the center point of the element assembly 10 in the cross section of the element assembly 10. The center point is a point at which the bottom surface 17 is divided into halves in the X-direction and in the Y-direction and at which the first end surface 15 is divided into halves in the Z-direction. If the portion within the radius of about 10 µm is occupied by the coil 20 and the like and the content of the crystalline filler is difficult to calculate, the center portion 103 is expanded to a portion within a radius of about 20 µm from the center point.

The content of the crystalline filler is calculated as described below. The area of the crystalline filler per unit area (reference area) is obtained from a cross-sectional image (an SEM image) of the center portion 103 parallel to the XZ plane orthogonal to the stacking direction. In the same manner, the area of the crystalline filler per unit area (target area) is obtained from a cross-sectional image of the measurement target (filler-poor glass portion 101). An area ratio (%) is obtained by dividing the target area by the reference area. The resulting area ratio corresponds to the content of the crystalline filler.

The content of the crystalline filler in the filler-poor glass portion 101 is preferably about 40% or less the content of the crystalline filler in the center portion 103 of the element assembly 10, more preferably about 30% or less, further preferably about 20% or less, and particularly preferably about 10% or less. The content of the crystalline filler in the filler-poor glass portion 101 being about 10% or less the content of the crystalline filler in the center portion 103 of the element assembly 10 enables the dielectric loss of the inductor component 1 to be further reduced and enables the Q-value to be further increased since the amount of the crystalline filler having relatively high permittivity is further reduced around the coil 20.

The filler-poor glass portion 101 covers the coil 20. In the present specification, the filler-poor glass portion 101 covering the coil 20 denotes the coil 20 being completely covered with the filler-poor glass portion 101. The coil 20 being covered by the filler-poor glass portion 101 enables the dielectric loss of the inductor component 1 to be reduced and enables the Q-value to be further increased since the amount of the crystalline filler having relatively high permittivity is further reduced around the coil 20.

Meanwhile, the coil 20 being covered by the filler-poor glass portion 101 is conjectured to be due to a liquefied glass phase having reduced rheology during a sintering step in the method for manufacturing the inductor component 1 existing around the coil 20. In such a case, regarding the inductor component 1 according to the present embodiment, the smoothness of the surface of the coil 20 is improved, and the Q-value can be increased at high frequencies.

In this regard, the coil 20 may be partly coated with the filler-poor glass portion 101. That is, the insulator material may contain the filler-poor glass portion 101 in a region along part of the coil 20. More specifically, only the inner-circumference side of the coil 20 may be coated with the filler-poor glass portion 101. That is, the insulator material may contain the filler-poor glass portion 101 in a region along the inner circumference of the coil 20. Therefore, the filler-poor glass portion 101 may be in contact with the inner edge of the coil 20. Meanwhile, only the outer-circumference side of the coil 20 may be coated with the filler-poor glass portion 101. That is, the insulator material may contain the filler-poor glass portion 101 in a region along the outer circumference of the coil 20. Therefore, the filler-poor glass portion 101 may be in contact with the outer edge of the coil 20.

The coil 20 partly includes an amorphous material (hereafter referred to as an exposed glass 107). A high-frequency current preferentially flows through the surface portion of the coil 20 due to a skin effect. Therefore, the coil 20 partly including the exposed glass 107 forms a recessed portion in the surface portion of the coil 20 so as to increase the surface area of the coil 20. Consequently, electric resistance is reduced. As a result, regarding the inductor component 1 according to the present embodiment, the Q-value can be further increased at high frequencies.

In addition, when the coil 20 partly includes the exposed glass 107, the liquid phase sintering is conjectured to advance to such an extent that the amorphous material reaches the surface from inside the coil 20 during the sintering step in the method for manufacturing the inductor component 1. As a result, regarding the inductor component 1 according to the present embodiment, the smoothness of the coil 20 is further improved, and the Q-value can be further increased at high frequencies.

The coil 20 may completely include the amorphous material (hereafter referred to as an inclusion glass 105). The coil 20 completely including the inclusion glass 105 forms the interface between the coil 20 and the inclusion glass 105 inside the coil 20. Consequently, the surface area of the coil 20 increases, and electric resistance is reduced due to a skin effect at high frequencies. As a result, regarding the inductor component 1 according to the present embodiment, the Q-value can be further increased at high frequencies.

Method for Manufacturing Inductor Component

An example of the method for manufacturing an inductor component will be described below with reference to FIG. 2. The method for manufacturing an inductor component includes a mother multilayer body formation step of forming a mother multilayer body, a cutting step of cutting the mother multilayer body so as to form a multilayer body, a sintering step of sintering the multilayer body, and a polishing step of polishing the sintered multilayer body.

Mother Multilayer Body Formation Step

The mother multilayer body is an aggregate in which a plurality of multilayer bodies are integrally formed. In the following description, members in an aggregation state are indicated by the same names and references as those of members after being divided.

In the mother multilayer body formation step, an insulating layer 11 is formed, and a conductor layer is formed on the insulating layer 11. This step is repeated so as to stack a plurality of insulating layers 11 provided with the conductor layer. In this manner, a mother multilayer body is formed. The mother multilayer body formation step in which a screen printing method and a photolithography method are used will be described below.

1. Preparation of Paste

A photosensitive insulating paste, a photosensitive conductive paste, and an outer-electrode conductive paste are prepared. The insulating paste contains a glass material (more specifically a glass powder serving as the base material) composed of a filler material (serving as the crystalline filler) and an amorphous material and a solvent. The amorphous material is, for example, a borosilicate glass. The crystalline filler is, for example, a ceramic. The insulating paste may further contain an organic material and a composite material. Of these, a material having low permittivity and low dielectric loss is preferable. Examples of the organic material include polymers (more specifically, epoxy resins, acrylic resins, fluororesins, and the like). Examples of the composite material include glass epoxy resins.

The conductive paste contains the glass material composed of the amorphous material, a conductive material (more specifically, a metal powder), and a solvent. Preferably, the conductive material is a good conductive material and is, for example, Ag, Cu, or Au. The outer-electrode conductive paste contains a conductive material and a solvent but does not contain a glass material composed of the amorphous material.

2. Formation of Outer-Layer Insulating Layer

The outer-layer insulating layer (insulating paste layer) 11 corresponds to the second insulating layer 11 from the bottom in FIG. 2. A base member, for example, a carrier film, not shown in the drawing, is coated with the insulating paste by using a screen printing method. This is repeated so as to form the outer-layer insulating layer 11 having a predetermined thickness.

3. Formation of Insulating Layer (First Layer) Provided with Conductor Layer

The outer-layer insulating layer 11 is coated with the insulating paste by using the screen printing method so as to form an insulating layer 11. The resulting insulating layer 11 corresponds to the third insulating layer 11 from the bottom in FIG. 2.

Subsequently, the insulating layer 11 is coated with the photosensitive conductive paste by using the screen printing method so as to form a photosensitive conductive paste layer. The photosensitive conductive paste layer is patterned by using a photolithography method so as to form a conductor layer. Specifically, exposure is performed by subjecting the photosensitive conductive paste layer to active-energy-ray irradiation (more specifically, irradiation with ultraviolet rays or the like) through a photomask in accordance with a predetermined coil pattern. From the viewpoint of forming a high-definition pattern, it is preferable that the active energy ray have a short wavelength and high rectilinear propagation. Examples of the light source during exposure include mercury lamps (g-line and i-line), LEDs, excimer lasers, EUV light sources, X-rays, and electron beams. After exposure, development is performed with a developing solution (more specifically, an alkali solution or the like). In this manner, a coil conductor layer 25 having a predetermined coil pattern is formed. In the same manner, an outer conductor layer having a predetermined pattern is formed by using the outer-electrode conductive paste. As a result, an insulating layer 11 provided with the coil conductor layer 25 and the outer conductor layer is formed.

4. Formation of Insulating Layer (Second Layer) Provided with Conductor Layer

A second layer of the insulating layers 11 provided with the conductor layer is formed. The resulting insulating layer 11 corresponds to the fourth insulating layer 11 from the bottom in FIG. 2. The second layer of the insulating layers 11 is different from the first layer of the insulating layers 11 in that an opening and a via hole are included while the coil conductor layer 25 is not included.

The first layer of the insulating layers 11 is coated with the photosensitive insulating paste so as to form an insulating paste layer. The insulating layer 11 having the opening and the via hole is formed by using the photolithography method. A conductive layer is formed in the opening and the via hole by using the screen printing method. In this manner, the insulating layer 11 provided with the conductor layer and the via hole 26 is formed.

5. Formation of Insulating Layer (Third Layer) Provided with Conductor Layer

A third layer of the insulating layers 11 provided with the conductor layer is formed. The resulting insulating layer 11 corresponds to the fifth insulating layer 11 from the bottom in FIG. 2. The third layer of the insulating layers 11 is different from the second layer of the insulating layers 11 in that the coil conductor layer 25 is included.

An insulating layer having an opening and a via hole is formed on the second layer of the insulating layers 11 by using the photolithography method. A conductive layer is formed by applying the photosensitive conductive paste and using the photolithography method. In this manner, the coil conductor layer 25 is formed in the via hole and on the insulating layer 11, and an outer conductor layer is formed in the opening so as to form the third layer of the insulating layers 11.

6. Stacking

The steps of forming the second layer and the third layer of the insulating layers 11 are repeated so as to form the fourth and subsequent layers of the insulating layers 11. The fourth and subsequent layers of the insulating layers 11 correspond to the sixth to eleventh insulating layers 11 from the bottom in FIG. 2. Thereafter, an outer-layer insulating layer 11 is formed. The outer-layer insulating layer 11 corresponds to the twelfth insulating layer 11 from the bottom in FIG. 2. In this manner, a mother multilayer body is produced.

In this regard, a mark layer 12 may be formed before or after the outer-layer insulating layer 11 is formed. The mark layer 12 is a layer colored by, for example, a mixture of the insulating paste and a filler.

A spin coating method or a spray coating method may be used instead of the screen printing method.

The mother multilayer body may include, as the lowermost layer, an insulating layer 11 provided with no conductor layer.

The opening or the via hole may be formed by laser beam machining or drilling after pressure bonding of the insulating material sheets, the spin coating, or the spray coating.

Regarding formation of the conductor layer, a conductor layer having a cross-sectional shape with a high aspect ratio (substantially rectangle) may be produced by forming and stacking a plurality of conductor layers. The plurality of conductor layers may be formed by performing the screen printing method and the photolithography method a plurality of times or by performing other methods in combination.

Meanwhile, the conductor layer instead of the photosensitive conductive paste layer may be formed by using a sputtering method, an evaporation method, a foil pressure bonding method, and the like. Patterning of the conductor layer is not limited to the above-described subtractive method (more specifically, a photolithography method or the like), and an additive method (more specifically, a printing lamination method, a semiadditive method, or the like) may be used. The semiadditive method is, for example, a method in which, after a negative pattern is formed, a plating film is formed and unnecessary portions are removed. The printing lamination method is, for example, a method in which a screen plate in accordance with a predetermined coil pattern is used.

In the mother multilayer body formation step, the mother multilayer body may be produced by forming the third, the fifth, the seventh, the ninth, and the eleventh insulating layers 11 and the outer-layer insulating layer 11. The inductor component 1 produced by this method has a structure in which insulating layers provided with a coil conductor layer are directly stacked.

Cutting Step

The cutting step forms multilayer bodies by cutting the mother multilayer body. For example, the mother multilayer body is cut with a dicing machine or the like such that the outer conductor layer is exposed at the cut surface so as to form a plurality of unsintered multilayer bodies.

Sintering Step

Figure 5A:
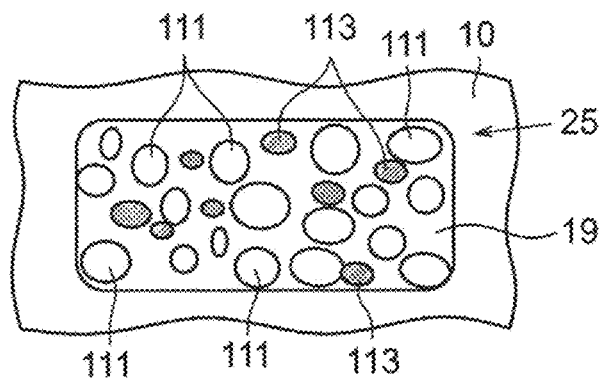
FIG. 5A is an explanatory diagram illustrating a method for manufacturing an inductor component.
Figure 5B:
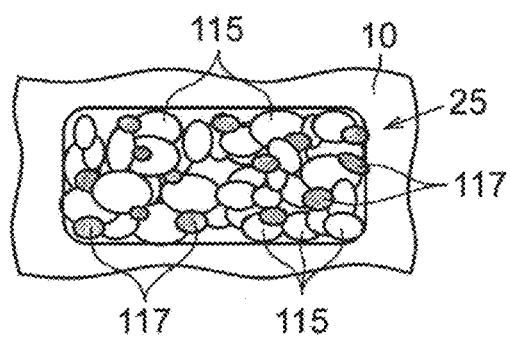
FIG. 5B is an explanatory diagram illustrating a method for manufacturing an inductor component.
Figure 5C:
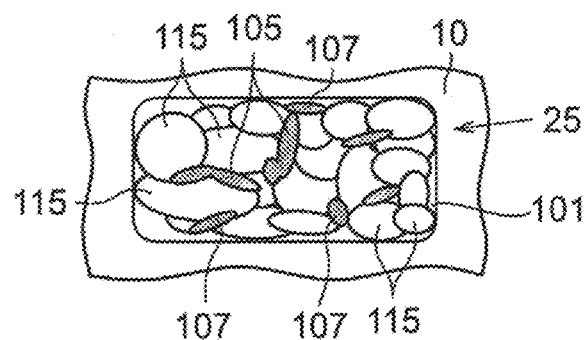
FIG. 5C is an explanatory diagram illustrating a method for manufacturing an inductor component.

The sintering step sinters the multilayer body. Formation of the coil conductor layer 25 in the sintering step will be described with reference to FIG. 5A to FIG. 5C. FIG. 5A to FIG. 5C are sectional views illustrating changes of the coil conductor layer 25 during the sintering step. As shown in FIG. 5A, the coil conductor layer 25 before sintering is a photo-cured photosensitive conductive paste and is in the state in which a metal powder 111 and a glass powder 113 are dispersed in a varnish 19.

When sintering is started in this state, as shown in FIG. 5B, burning and scattering of the solvent advance, and adjacent particles of the metal powder 111 sinter due to local necking so as to form metal portions 115. Meanwhile, particles of the glass powder 113 are softened and flow between the metal portions 115 so as to form the glass portions 117.

Figure 6:
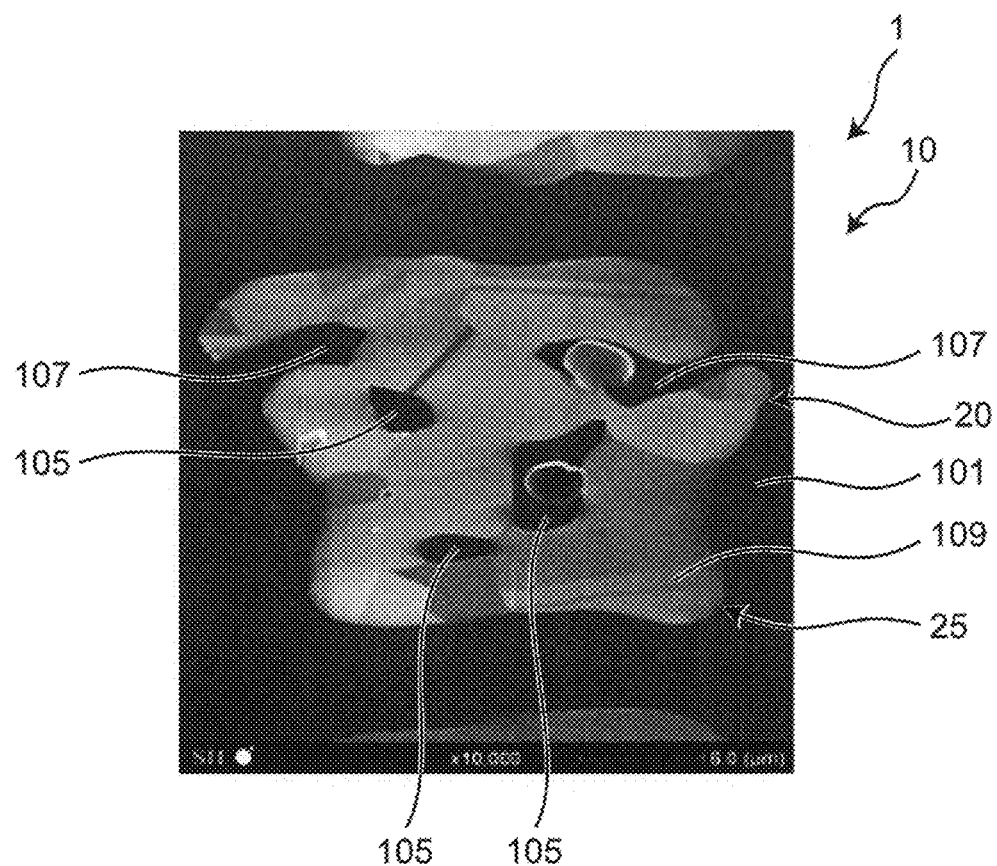
FIG. 6 is an image diagram of an example of an inductor component.

At this time, as shown in FIG. 5C, softened glass portions 117 are pushed to the outside portion due to necking of the metal powder 111 and move to the outer peripheral edge of the coil conductor layer 25. Consequently, since the surface of the coil conductor layer 25 is sintered in the softened glass (glass portions 117) pushed out, that is, in a liquid phase, sintering is further facilitated, and smoothening of the surface and crystal growth tend to occur. The number of crystal grain boundaries that hinder a current flow is thereby decreased, and electric resistance that causes loss is reduced. As a result, the Q-value of the inductor component 1 can be further increased. Meanwhile, inclusion glasses 105, exposed glasses 107, and a filler-poor glass portion 101 are formed as the glass portions 117. The inclusion glass 105 is formed as a result of the glass portion 117 that is located at the position far from the outer peripheral edge of the coil conductor layer 25 remaining in the coil conductor layer 25 without being pushed out. The exposed glass 107 is formed as a result of the glass portion 117 that is located at the position relatively near to the outer peripheral edge of the coil conductor layer 25 remaining in the vicinity of the surface of the coil conductor layer 25 without being completely pushed out. The filler-poor glass portion 101 is formed as a result of the glass portion 117 that is located at the position near to the outer peripheral edge of the coil conductor layer 25 being completely pushed out. Therefore, as shown in FIG. 6 described later, the resulting coil conductor layer 25 includes the metal portions 115 and the glass portions 117, and the glass portions 117 include the inclusion glasses 105 and the exposed glasses 107. Conversely, the filler-poor glass portion 101 existing in a region along the coil conductor layer 25 denotes the surface of the coil conductor layer 25 having sintered in the liquid phase, and the outer peripheral edge composed of the metal portions 115 and the exposed glasses 107 is smoothened. In this manner, the inductor component 1 according to the first embodiment is produced.

In this regard, the proportion of the inclusion glasses 105 in the glass portions 117 is in accordance with the amount of the exposed glasses 107 pushed out (amount of the filler-poor glass portion 101 formed) and, therefore, can be controlled on the basis of the degree of advance of sintering, more specifically, the degree of necking with reference to the volume of the metal powder 111, serving as the indicator. The degree of necking of the metal powder 111 is controlled by, for example, the temperature and the time during firing.

In this regard, when the degree of advance of sintering is further increased, the outer peripheral edge of the coil conductor layer 25 is covered by the glass portion pushed out (filler-poor glass portion 101). That is, the filler-poor glass portion 101 covers the coil 20. Consequently, the outer peripheral edge of the coil conductor layer 25 is further smoothened. In this manner, the smoothness of the surface of the coil 20 can be controlled on the basis of the degree of advance of sintering. However, in the inductor component 1, the filler-poor glass portion 101 is not limited to completely covering the coil 20 but may exist in a region along the coil 20, and the surface of the coil 20 is smoothened along the location of the filler-poor glass portion 101. That is, the filler-poor glass portion 101 may be partly located provided that the filler-poor glass portion 101 is in contact with the coil 20. For example, the filler-poor glass portion 101 may be located on only the inner-circumference side or on only the outer-circumference side of the coil 20. The filler-poor glass portion 101 may be located along the outer edge and the inner edge of the winding portion 21a of the coil 20.

Polishing Step

In the polishing step, the sintered multilayer body is polished by, for example, barrel finishing.

Other Step

The method for manufacturing the inductor component 1 may further include a plating step. The plating step is performed after the polishing step so as to subject the outer conductor layer exposed at the outer surface of the multilayer body to plating. In addition, after the polishing step and before the plating step, a conductor layer may be further formed on the outer conductor layer of the multilayer body by using a dipping method, a sputtering method, or the like.

Example

The inductor component 1 of the example had a structure in which the insulating layers 11 provided with the coil conductor layer 25 were directly stacked.

Mother Multilayer Body Formation Step

An insulating paste layer was formed by repeating application of an insulating paste containing the borosilicate glass as a primary component by screen printing. The insulating paste layer was an outer-layer insulating layer located outside the coil conductor layer 25 in the stacking direction. The borosilicate glass contained B, Si, O, and K.

The photosensitive conductor paste layer was formed on the outer-layer insulating layer by coating. The coil conductor layer 25 and the outer conductor layer were formed by a photolithography step. Specifically, the photosensitive conductor paste layer was formed by applying the photosensitive conductor paste containing Ag as a metal primary component by screen printing. The photosensitive conductor paste layer was irradiated with ultraviolet rays or the like through a photomask, and development with an alkali solution or the like was performed. The coil conductor layer 25 and the outer conductor layer that have a predetermined pattern can be formed by using the photomask. In this manner, the insulating paste layer provided with the coil conductor layer 25 and the outer conductor layer was formed.

The insulating paste layer provided with an opening and a via hole was formed by the photolithography step. Specifically, the photosensitive insulating paste layer was formed on the insulating paste layer by applying the photosensitive insulating paste by screen printing. The photosensitive insulating paste layer was irradiated with ultraviolet rays or the like through a photomask, and development with an alkali solution or the like was performed. In this manner, the insulating paste layer was formed.

The coil conductor layer 25, the outer conductor layer, a conductor layer to couple the outer conductor layer, and the via hole conductor 26 were formed on the insulating paste layer by the photolithography step. Specifically, the photosensitive conductor paste layer was formed by applying the photosensitive conductor paste containing Ag as a metal primary component by screen printing. The photosensitive conductor paste layer was irradiated with ultraviolet rays or the like through a photomask, and development with an alkali solution or the like was performed. In this manner, the conductor layer was formed in the opening, the via hole conductor 26 was formed in the via hole, and the coil conductor layer 25 was formed on the insulating paste layer and in the opening. Consequently, the insulating paste layer provided with the coil conductor layer 25, the outer conductor layer, the conductor layer, and the via hole conductor 26 was formed.

The coil conductor layer 25, the outer conductor layer, and the like were formed on the insulating paste layer and inside (in the opening and the via hole) the insulating paste layer.

An insulating paste layer was formed by repeating application of an insulating paste by screen printing. The resulting insulating paste layer was an outer-layer insulating layer located outside the coil conductor layer 25. The mother multilayer body was obtained through the above-described steps.

Cutting Step

The mother multilayer body was cut with a dicing machine or the like into a plurality of unsintered multilayer bodies. In the cutting step of the mother multilayer body, the outer electrodes 30 and 40 were exposed at the cut surface formed by cutting the multilayer body.

Sintering Step

The unsintered multilayer body was sintered under a predetermined condition so as to obtain a multilayer body. The sintering condition was adjusted such that the multilayer body after sintering included the coil 20 shown in FIG. 6 described later.

Polishing Step

The resulting multilayer body was subjected to polishing. Ni plating having a thickness of about 2 μm to 10 μm and Sn plating having a thickness of about 2 μm to 10 μm were applied to the portions of the multilayer body, at which the outer electrodes 30 and 40 were exposed.

An electronic component of 0.4 mm×0.2 mm×0.2 mm was produced through the above-described steps.

FIG. 6 is a sectional image diagram of an example of the inductor component 1. FIG. 6 is a diagram showing a magnified cross section of the coil 20 shown in FIG. 4. The coil 20 completely includes inclusion glasses 105 and partly includes exposed glasses 107. Meanwhile, the coil 20 is covered by the filler-poor glass portion 101.

Figure 7:
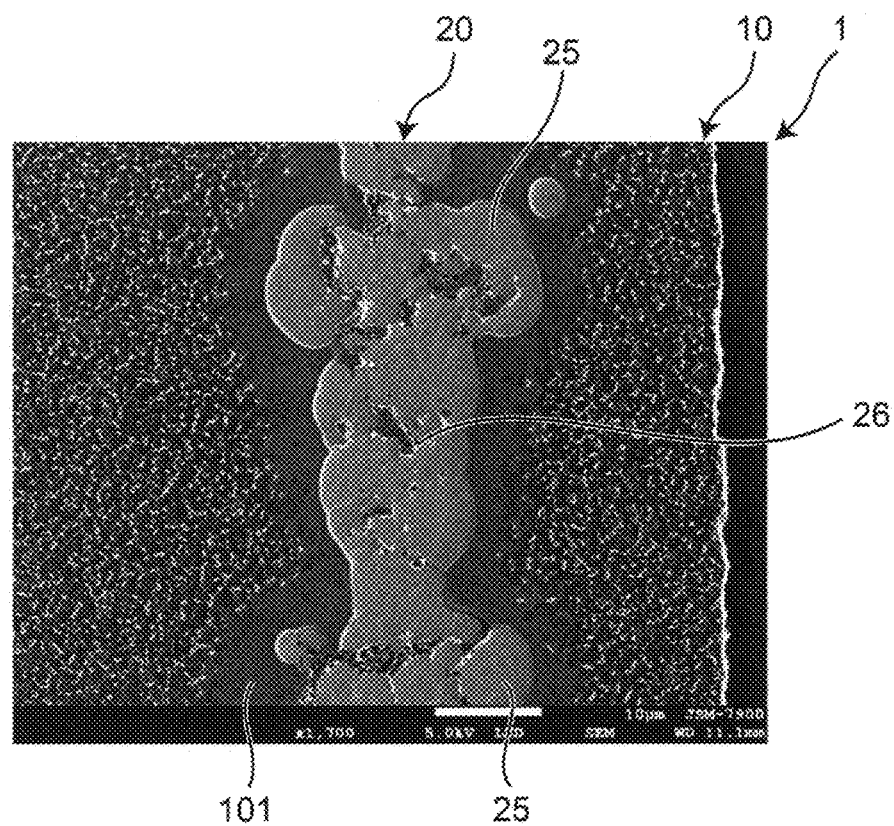
FIG. 7 is an image diagram of an example of an inductor component.

FIG. 7 is a sectional image diagram of the example of the inductor component 1. FIG. 7 is a sectional view of the coil wiring line 21 (coil conductor layer 25) and the via hole conductor 26 cut with the YZ plane. The element assembly 10 has a region including a myriad of white points, that is, a region other than the filler-poor glass portion 101. The white points indicate the crystalline filler. Meanwhile, the element assembly 10 has the filler-poor glass portion 101 indicated by a black region. The filler-poor glass portion 101 hardly contains the crystalline filler. The filler-poor glass portion 101 covers the coil wiring line 21 and the via hole conductor 26.

Second Embodiment

Figure 8:
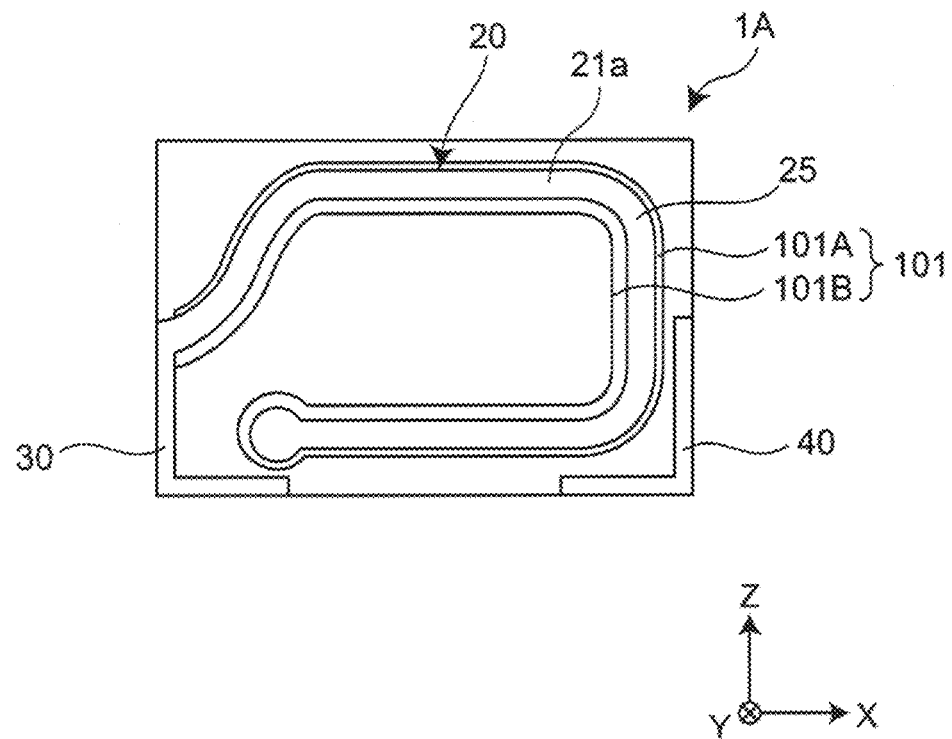
FIG. 8 is a sectional view showing a second embodiment of the inductor component.

FIG. 8 is a sectional view showing a second embodiment of an inductor component 1A. The second embodiment is different from the first embodiment in that the thickness of the filler-poor glass portion 101 near to the outer edge of the coil conductor layer 25 is different from the thickness near to the inner edge of the coil conductor layer 25. The configuration including this difference will be described below. In the second embodiment, the same references as in the first embodiment indicate the same configurations as in the first embodiment and explanations thereof are omitted.

As shown in FIG. 8, the inductor component 1A according to the second embodiment includes a first filler-poor glass portion 101A and a second filler-poor glass portion 101B. In a plane perpendicular to the winding axis of the coil 20, the first filler-poor glass portion 101A is in contact with the outer edge of the coil wiring line 21, and the second filler-poor glass portion 101B is in contact with the inner edge of the coil wiring line 21. That is, the first filler-poor glass portion 101A is arranged in a region along the outer edge of the coil 20 and is in contact with the outer edge of the coil winding portion 21a of the coil 20. The second filler-poor glass portion 101B is arranged in a region along the inner edge of the coil 20 and is in contact with the inner edge of the coil winding portion 21a of the coil 20. The thickness of the first filler-poor glass portion 101A is less than the thickness of the second filler-poor glass portion 101B.

In such a case, the portion near to the outer surface of the inductor component 1A has a high crystalline filler content and relatively high strength. Therefore, regarding the inductor component 1A according to the present embodiment, cracking due to external impact is suppressed from occurring and the strength can be further enhanced.

Meanwhile, in such a case, a large amount of filler-poor glass portion 101 exists near the inner edge of the coil wiring line 21, and the amount of the crystalline filler is relatively small. A high-frequency current preferentially flows through the inner-edge portion of the coil 20 due to the skin effect. That is, a current preferentially flows through the portion in which the content of the crystalline filler is relatively low. Therefore, regarding the inductor component 1A according to the present embodiment, dielectric loss is reduced, and the Q-value can be further increased.

Examples of the method for realizing the configuration in which the thickness of the filler-poor glass portion 101 is different between a region near to the outer edge and a region near to the inner edge of the coil wiring line 21 include a method in which a concentration gradient of the amorphous material is provided between the region near to the inner edge and the region near to the outer edge of the coil conductor layer 25 in a plane perpendicular to the axis direction of the coil 20. Specifically, the coil conductor layer 25 is divided into the region near to the outer edge and the region near to the inner edge, and the coil conductor layer 25 is formed such that the amorphous material concentrations in the two regions are different from each other.

A first photosensitive conductor paste having a relatively low amorphous material concentration is prepared. A first photosensitive conductor paste layer is formed by coating the insulating layer 11 by using screen printing or the like. The first photosensitive conductor paste layer is subjected to exposure and development by using a photolithography method so as to form the region near to the outer edge of the coil conductor layer 25. Subsequently, a second photosensitive conductor paste having a relatively high amorphous material concentration is prepared, and a second photosensitive conductor paste layer is formed in the same manner as above. The second photosensitive conductor paste layer is subjected to exposure and development by using the photolithography method so as to form the region near to the inner edge of the coil conductor layer 25.

A concentration gradient of the amorphous material being provided between the region near to the inner edge and the region near to the outer edge of the coil conductor layer 25 in a plane perpendicular to the axis direction of the coil 20, as described above, enables the amount of the amorphous material bleeding from the outer circumferential surface of the coil conductor layer 25 in the sintering step thereafter to be adjusted. Consequently, the thickness of the filler-poor glass portion 101 near to the outer edge of the coil wiring line 21 can be made to differ from the thickness near to the inner edge of the coil wiring line 21. In this regard, in the above-described method, the coil conductor layer 25 is divided into two that are a region near to the inner edge and a region near to the outer edge but may be divided into three or more.

Third Embodiment

Figure 9:
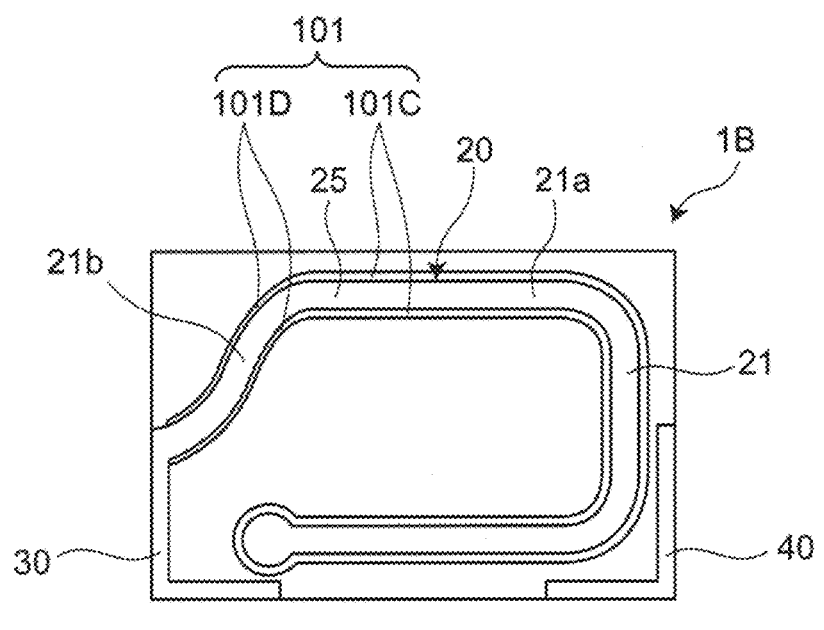
FIG. 9 is a sectional view showing a third embodiment of the inductor component.

FIG. 9 is a sectional view showing a third embodiment of the inductor component. The third embodiment is different from the first embodiment in that the thickness of the second portion 101D in contact with the extended electrode 21b is less than the thickness of the first portion 101C in contact with the winding portion 21a. The configuration including this difference will be described below. In the third embodiment, the same references as in the first embodiment indicate the same configurations as in the first embodiment and explanations thereof are omitted.

As shown in FIG. 9, in an inductor component 1B according to the third embodiment, the filler-poor glass portion 101 has the first portion 101C and the second portion 101D. The first portion 101C is in contact with at least part of the winding portion 21a. More specifically, the first portion 101C covers the winding portion 21a. The second portion 101D is in contact with at least part of the extended electrode 21b. More specifically, the second portion 101D covers the extended electrode 21b.

Meanwhile, the thickness of the second portion 101D is less than the thickness of the first portion 101C. In such a case, the portion near to the outer surface of the inductor component 1B has a relatively high crystalline filler content and relatively high strength. Therefore, regarding the inductor component 1B according to the present embodiment, cracking due to external impact can be suppressed from occurring.

The thickness of the second portion 101D can be made less than the thickness of the first portion 101C by using the method for providing the concentration gradient described in the second embodiment. Specifically, this can be realized by making the concentration of the amorphous material in the extended electrode 21b lower than the concentration of the amorphous material in the winding portion 21a.

Fourth Embodiment

Figure 10:
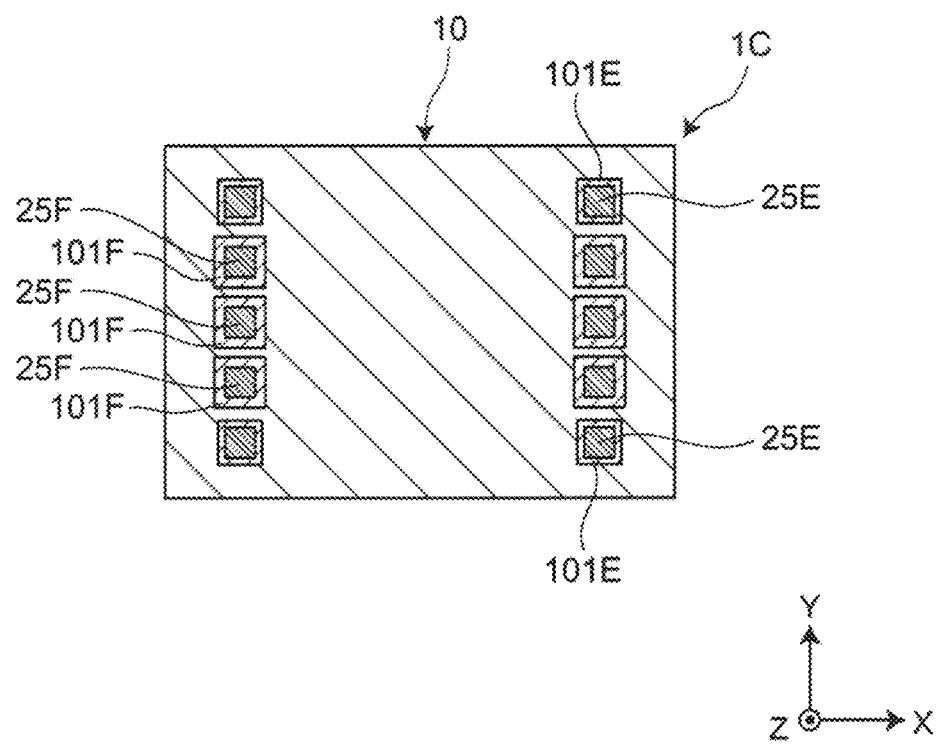
FIG. 10 is a sectional view showing a fourth embodiment of the inductor component.

FIG. 10 is a sectional view showing a fourth embodiment of the inductor component. The fourth embodiment is different from the first embodiment in that a plurality of insulating layers 11 are different from each other in the thickness of the filler-poor glass portion 101. The configuration including this difference will be described below. In the fourth embodiment, the same references as in the first embodiment indicate the same configurations as in the first embodiment and explanations thereof are omitted.

More specifically, as shown in FIG. 10, the element assembly 10 is a multilayer body in which five layers of the insulating layers 11 are stacked (interfaces between the insulating layers 11 are not shown in the drawing). As described above, the element assembly 10 is a multilayer body in which the plurality of insulating layers 11 are stacked.

In this regard, the thickness of each of third filler-poor glass portions 101E serving as the lowermost layer and the uppermost layer in the stacking direction of the insulating layers 11 is less than the thickness of each of fourth filler-poor glass portions 101F other than the lowermost layer and the uppermost layer. As described above, of the plurality of insulating layers 11, the thickness of the filler-poor glass portion in each of the insulating layers 11 serving as the lowermost layer and the uppermost layer in the coil axis direction is less than the thickness of the filler-poor glass portion in each of the insulating layers other than the lowermost layer and the uppermost layer. In such a case, the portion near to the outer surface of the inductor component 1C has a relatively high crystalline filler content and relatively high strength. Therefore, regarding the inductor component 1C according to the present embodiment, cracking due to external impact can be suppressed from occurring.

The thickness of the third filler-poor glass portion 101E can be made less than the thickness of the fourth filler-poor glass portion 101F by using the method for providing the concentration gradient described in the second embodiment. Specifically, this can be realized by making the concentration of the amorphous material in the coil conductor layer 25E in the insulating layers 11 serving as the lowermost layer and the uppermost layer lower than the concentration of the amorphous material in the coil conductor layer 25F in the insulating layers 11 other than the lowermost layer and the uppermost layer.

The inductor component according to the present disclosure is not limited to the above-described first to fourth embodiments. Publicly known and used technologies may be combined appropriately, or part of the embodiment may be modified or removed. Some of or all the first to fourth embodiments may be combined appropriately. The above-described bottom surface 17 provided with both the first outer electrode 30 and the second outer electrode 40 is a surface parallel to the axis direction of the coil 20, but the bottom surface 17 is not limited to this and may be a surface perpendicular to the axis direction of the coil 20.

In the above-described embodiment, the coil is included as the inner electrode. However, the coil is an example of the inner electrode, and the inner electrode may be an electrode constituting other electric elements.

Fifth Embodiment

Figure 11:
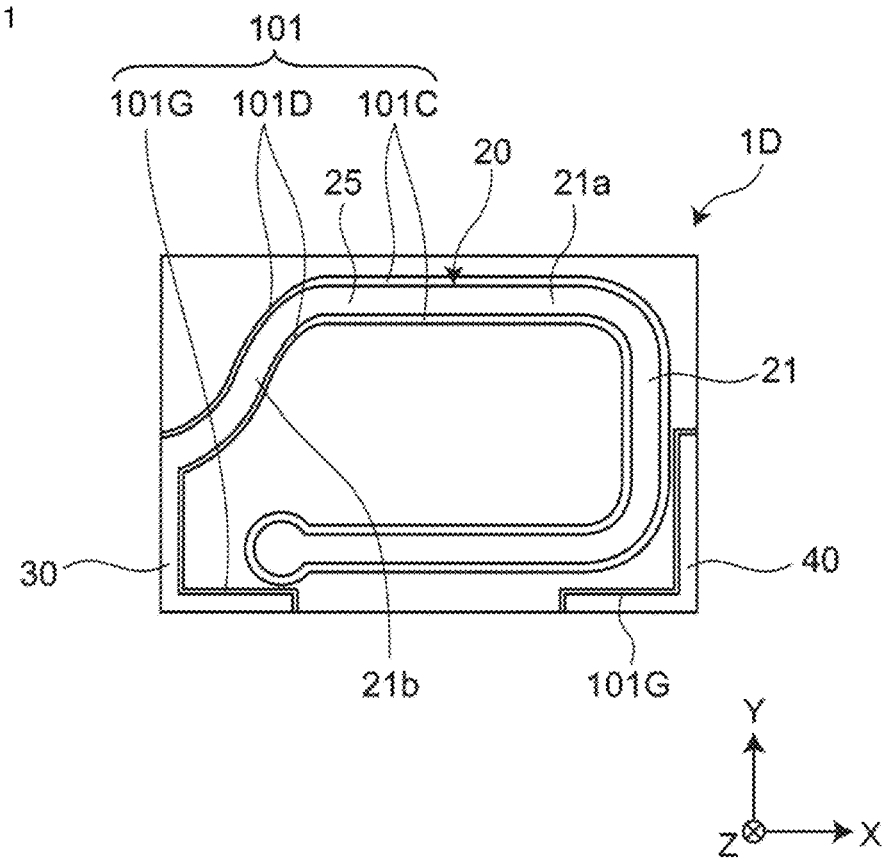
FIG. 11 is a sectional view showing a fifth embodiment of the inductor component.

FIG. 11 is a sectional view showing a fifth embodiment of the inductor component. The fifth embodiment is different from the third embodiment in that the filler-poor glass portion 101 further has a third portion 101G and the thickness of the third portion 101G in contact with the first outer electrode 30 and the second outer electrode 40 is less than the thickness of the first portion 101C in contact with the winding portion 21a. The configuration including this difference will be described below. In the fifth embodiment, the same references as in the first embodiment or the third embodiment indicate the same configurations as in the first embodiment or the third embodiment and explanations thereof are omitted.

As shown in FIG. 11, in an inductor component 1D according to the fifth embodiment, the filler-poor glass portion 101 has the third portion 101G in addition to the first portion 101C and the second portion 101D. The third portion 101G is in contact with at least part of each of the first outer electrode 30 and the second outer electrode 40. More specifically, the third portion 101G covers the inner edge of each of the first outer electrode 30 and the second outer electrode 40.

Meanwhile, the thickness of the third portion 101G is less than the thickness of the first portion 101C. In such a case, the portion near to the outer surface of the inductor component 1D has a relatively high crystalline filler content and relatively high strength. Therefore, regarding the inductor component 1D according to the present embodiment, cracking due to external impact can be suppressed from occurring.

The method for manufacturing the inductor component 1D is the same as the method for manufacturing the inductor component 1B in the third embodiment except that the outer electrode layer is formed by using a conductive paste instead of the outer-electrode conductive paste. The thickness of the third portion 101G can be made less than the thickness of the first portion 101C by using the method for providing the concentration gradient described in the second embodiment. Specifically, this can be realized by making the concentration of the amorphous material in the first outer electrode 30 and the second outer electrode 40 lower than the concentration of the amorphous material in the winding portion 21a. Consequently, the filler-poor glass portion 101 can be formed so as to be in contact with part of the inner edge of each of the first outer electrode 30 and the second outer electrode 40 in addition to covering the coil 20.

The present disclosure is not limited to the above-described embodiments, and the design can be changed within the gist of the present disclosure. In this regard, features of the first to fifth embodiments may be variously combined.

In the above-described embodiment, the filler-poor glass portion has the third portion in contact with at least part of the outer electrode. However, for example, in the first embodiment or the second embodiment, the filler-poor glass portion may have the third portion.

In the above-described embodiment, the thickness of the third portion is less than the thickness of the first portion. However, for example, in the case in which the third portion is included in the first embodiment or the second embodiment, there is no particular limitation regarding the relationship between the thickness of the first portion and the thickness of the third portion.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:
   an element assembly formed of an insulator material; and
   an inner electrode arranged in the element assembly,
   wherein
   the insulator material contains a base material formed of an amorphous material containing B, Si, O, and K and a crystalline filler and includes a filler-poor glass portion in a region along the inner electrode,
   a content of the crystalline filler in the filler-poor glass portion is lower than a content of the crystalline filler in the element assembly excluding the filler-poor glass portion, and
   a portion of the element assembly excluding the filler-poor glass portion is arranged directly between a first portion of the filler-poor glass portion, and a closest second portion of the filler-poor glass portion.

2. The inductor component according to claim 1, wherein the inner electrode partly includes the amorphous material containing B, Si, O, and K.

3. The inductor component according to claim 1, wherein the inner electrode completely includes the amorphous material containing B, Si, O, and K.

4. The inductor component according to claim 1, wherein the crystalline filler contains any of Al, Si, Ti, Zr, Ca, Mg, Fe, and Mn.

5. The inductor component according to claim 1, wherein the filler-poor glass portion covers the inner electrode.

6. The inductor component according to claim 1, wherein the inner electrode is a coil having a winding portion that is spirally wound,
   the filler-poor glass portion has a first filler-poor glass portion in contact with the outer edge of the winding portion of the coil and a second filler-poor glass portion in contact with the inner edge of the winding portion in a plane perpendicular to the winding axis of the coil, and
   a thickness of the first filler-poor glass portion is less than a thickness of the second filler-poor glass portion.

7. The inductor component according to claim 1, further comprising an outer electrode electrically coupled to the inner electrode,
   wherein
   the inner electrode is a coil having a winding portion that is spirally wound and an extended electrode to electrically couple the winding portion to the outer electrode,
   the filler-poor glass portion has a first portion in contact with at least part of the winding portion and a second portion in contact with at least part of the extended electrode, and
   a thickness of the second portion is less than a thickness of the first portion.

8. The inductor component according to claim 1, further comprising an outer electrode electrically coupled to the inner electrode, wherein the inner electrode is a coil having a winding portion that is spirally wound and an extended electrode to electrically couple the winding portion to the outer electrode, the filler-poor glass portion has a first portion in contact with at least part of the winding portion and a third portion in contact with at least part of the outer electrode, and a thickness of the third portion is less than a thickness of the first portion.

9. The inductor component according to claim 1, wherein the element assembly is a multilayer body in which a plurality of insulating layers provided with a coil conductor layer are stacked, and of the plurality of insulating layers, a thickness of the filler-poor glass portion in each of the lowermost insulating layer and the uppermost insulating layer in the coil axis direction is less than a thickness of the filler-poor glass portion in each of the insulating layers other than the lowermost insulating layer and the uppermost insulating layer.

10. The inductor component according to claim 1, wherein the inner electrode has a smooth surface.

11. The inductor component according to claim 2, wherein the crystalline filler contains any of Al, Si, Ti, Zr, Ca, Mg, Fe, and Mn.

12. The inductor component according to claim 3, wherein the crystalline filler contains any of Al, Si, Ti, Zr, Ca, Mg, Fe, and Mn.

13. The inductor component according to claim 2, wherein the content of the crystalline filler in the filler-poor glass portion is 10% or less the content of the crystalline filler in a center portion of the element assembly.

14. The inductor component according to claim 2, wherein the filler-poor glass portion covers the inner electrode.

15. The inductor component according to claim 2, wherein the inner electrode is a coil having a winding portion that is spirally wound, the filler-poor glass portion has a first filler-poor glass portion in contact with the outer edge of the winding portion of the coil and a second filler-poor glass portion in contact with the inner edge of the winding portion in a plane perpendicular to the winding axis of the coil, and a thickness of the first filler-poor glass portion is less than a thickness of the second filler-poor glass portion.

16. The inductor component according to claim 2, further comprising an outer electrode electrically coupled to the inner electrode, wherein the inner electrode is a coil having a winding portion that is spirally wound and an extended electrode to electrically couple the winding portion to the outer electrode, the filler-poor glass portion has a first portion in contact with at least part of the winding portion and a second portion in contact with at least part of the extended electrode, and a thickness of the second portion is less than a thickness of the first portion.

17. The inductor component according to claim 2, further comprising an outer electrode electrically coupled to the inner electrode, wherein the inner electrode is a coil having a winding portion that is spirally wound and an extended electrode to electrically couple the winding portion to the outer electrode, the filler-poor glass portion has a first portion in contact with at least part of the winding portion and a third portion in contact with at least part of the outer electrode, and a thickness of the third portion is less than a thickness of the first portion.

18. The inductor component according to claim 2, wherein the element assembly is a multilayer body in which a plurality of insulating layers provided with a coil conductor layer are stacked, and of the plurality of insulating layers, a thickness of the filler-poor glass portion in each of the lowermost insulating layer and the uppermost insulating layer in the coil axis direction is less than a thickness of the filler-poor glass portion in each of the insulating layers other than the lowermost insulating layer and the uppermost insulating layer.

19. The inductor component according to claim 2, wherein the inner electrode has a smooth surface.

20. An inductor component comprising:
an element assembly formed of an insulator material; and
an inner electrode arranged in the element assembly, wherein
the insulator material contains a base material formed of an amorphous material containing B, Si, O, and K and a crystalline filler and includes a filler-poor glass portion in a region along the inner electrode,
a content of the crystalline filler in the filler-poor glass portion is lower than a content of the crystalline filler in the element assembly excluding the filler-poor glass portion,
the content of the crystalline filler in the filler-poor glass portion is 10% or less the content of the crystalline filler in a center portion of the element assembly, and
the filler-poor glass portion is in direct contact with the inner electrode around an entire circumference of the inner electrode when viewed as a cross-section along an axial direction of the inner electrode.

* * * * *